US012394912B2

(12) United States Patent
Johnson et al.

(10) Patent No.: US 12,394,912 B2
(45) Date of Patent: Aug. 19, 2025

(54) FLEXIBLE APERTURE FED PATCH ANTENNA

(71) Applicant: BAE SYSTEMS Information and Electronic Systems Integration Inc., Nashua, NH (US)

(72) Inventors: Alexander D. Johnson, Waltham, MA (US); Jean L. Kubwimana, Merrimack, NH (US); Jacob Tamasy, Nashua, NH (US); James F. Fung, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 171 days.

(21) Appl. No.: 18/356,595

(22) Filed: Jul. 21, 2023

(65) Prior Publication Data

US 2025/0030175 A1 Jan. 23, 2025

(51) Int. Cl.
*H01Q 21/06* (2006.01)
*H01Q 1/08* (2006.01)
*H01Q 9/04* (2006.01)

(52) U.S. Cl.
CPC ........... *H01Q 21/065* (2013.01); *H01Q 1/085* (2013.01); *H01Q 9/0407* (2013.01)

(58) Field of Classification Search
CPC ...... H01Q 1/085; H01Q 1/087; H01Q 1/1235; H01Q 9/0407; H01Q 21/065
See application file for complete search history.

(56) References Cited

U.S. PATENT DOCUMENTS

2014/0266973 A1 9/2014 Devries et al.
2020/0373673 A1 11/2020 Hashemi et al.
(Continued)

FOREIGN PATENT DOCUMENTS

WO WO-2007142125 A1 * 12/2007 ............. A47H 23/08

OTHER PUBLICATIONS

Elmobarak et al., "Flexible Patch Antenna Array Operating at Microwaves Based on Thin Composite Material", HAL, Nov. 8, 2022, retrieved on [Aug. 23, 2024]. Retrieved from the internet <URL: https://hal .science/hal-03841042vl/file/Elmobarak_Flexible_ Patch_ Antenna.pdf> entire document.
(Continued)

*Primary Examiner* — Daniel Munoz
(74) *Attorney, Agent, or Firm* — Gary McFaline

(57) ABSTRACT

An antenna assembly includes a first flexible layer including a conductive ground plane on a first layer of dielectric material, and a second flexible layer including a first array of conductive patches on a second layer of dielectric material. The antenna assembly further includes a second array of conductive patches on a third layer of dielectric material. The first, second, and third flexible layers are rollable or foldable, to provide a stowed position for the antenna assembly and a deployed position for the antenna assembly. In an example, the first array of conductive patches includes at least a first patch and a second patch, and the second array of conductive patches includes at least a third patch and a fourth patch. In the deployed position, the first patch is above the third patch and the ground plane, and the second patch is above the fourth patch and the ground plane.

13 Claims, 8 Drawing Sheets

(56) References Cited

U.S. PATENT DOCUMENTS

| | | | |
|---|---|---|---|
| 2021/0408660 | A1 | 12/2021 | Verwoerd |
| 2023/0178895 | A1 | 6/2023 | Johnson et al. |

OTHER PUBLICATIONS

International Search Report, PCT/US 2024/037371, mailed Sep. 24, 2024, 16 pages.

* cited by examiner

FLEXIBLE APERTURE FED PATCH ANTENNA

FIELD OF DISCLOSURE

The present disclosure relates to antennas, and more particularly, to patch antenna structures.

BACKGROUND

A patch antenna is a type of low profile antenna that can be mounted on a surface. It includes a sheet or “patch” of conductive material, such as metal, above a larger ground plane metal sheet, where the patch and the ground plane are separated by a dielectric material or air. The conductive patch provides a resonant transmission line, with its length corresponding to approximately one-half the wavelength of the resonant frequency. A patch antenna is often used at the radio frequency (RF) range, as such wavelengths are relatively short, which in turn allows the patches to be relatively small. There remain a number of non-trivial challenges with respect to designing and manufacturing patch antenna structures.

Figure 1A:
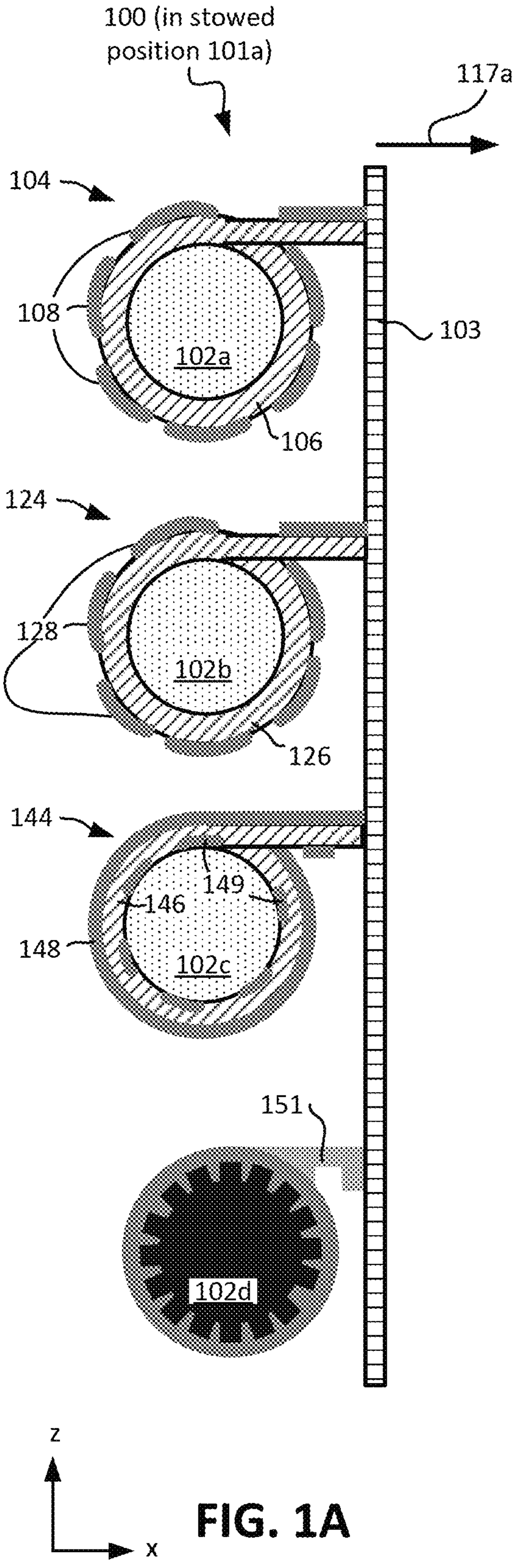
FIGS. 1A, 1B, 1C, 1D, and 1E illustrate various views of an antenna assembly, wherein the antenna assembly comprises (i) a first flexible layer including a ground plane on a first layer of dielectric material, (ii) a second flexible layer including a first array of conductive patches on a second layer of dielectric material, and (ii) a third flexible layer including a second array of conductive patches on a third layer of dielectric material, wherein the antenna assembly is rollable between stowed and deployed positions, in accordance with an embodiment of the present disclosure.

Although the following detailed description will proceed with reference being made to illustrative examples, many alternatives, modifications, and variations thereof will be apparent in light of this disclosure.

DETAILED DESCRIPTION

Patch antenna assemblies comprising an array of antenna structures are disclosed. In an example, an antenna assembly comprises an aperture fed, stacked patch antenna structure that includes a plurality of flexible layers, and that can be arranged in a stowed position or a deployed position. For example, the flexible layers of the antenna assembly are foldable or rollable between the stowed and deployed positions. In operation, at least partially folding or rolling one or more of such flexible layers of the antenna assembly results in the stowed position of the antenna assembly; also, unrolling or unfolding the one or more of such flexible layers of the antenna assembly results in the deployed position of the antenna assembly.

When the antenna assembly is in the stowed position, the antenna assembly has a relatively compact form factor, compared to a form factor of the antenna assembly in the deployed position. Accordingly, the antenna assembly may be easier to transport (or more safely or otherwise practically transported) from one geographical location or another, while in the stowed position. Once arrived at a desired location, the antenna assembly can be rearranged in the deployed position, thus readying the antenna assembly for radiating (transmitting and/or receiving) signals. The antenna assembly may be caused to transition between the stowed and deployed positions manually and/or using a motorized arrangement.

In one embodiment, an antenna assembly comprises a first flexible layer including a ground plane on a first layer of dielectric material, and a second flexible layer including a first array of conductive patches on a second layer of dielectric material. In an example, the antenna assembly further comprises a second array of conductive patches on a third layer of dielectric material. The first, second, and third flexible layers are rollable or foldable, to provide a stowed position for the antenna assembly (when folded or rolled-up) and a deployed position for the antenna assembly (when unfolded or unrolled). In an example, the first array of conductive patches includes at least a first patch and a second patch, and the second array of conductive patches includes at least a third patch and a fourth patch. In the deployed position, the first patch is above the third patch and the ground plane, and the second patch is above the fourth patch and the ground plane. Thus, the first and third patches form a first vertical stack of patches of a first antenna structure, and the second and fourth patches form a second vertical stack of patches of a second antenna structure. The ground plane has one or more aperture slots (such as two aperture slots) corresponding to each vertical stack of patches, in an example. One aperture slot may be used for horizontally polarized signals, and another aperture slot may be used for vertically polarized signals, so as to provide a dual polarized, aperture fed, stacked patch antenna array, in an example. Numerous configurations and variations will be apparent in light of this disclosure.

General Overview

As mentioned herein above, there remain a number of non-trivial challenges with respect to patch antenna assemblies. For example, patch antenna assemblies may include printed circuit board (PCB) material as a base substrate or dielectric material layer. For efficiently transmitting high frequency signals, such as radio frequency (RF) signals (e.g., for very high frequency or VHF signals, or for ultra-high frequency or UHF signals), the antenna assembly may be made relatively large. Such bulky patch antenna assemblies may be difficult to transport from one geographical location to another, owing to a correspondingly bulky form factor of the patch antenna assemblies, in an example.

Accordingly, techniques are described herein to form flexible aperture fed stacked patch antenna structures that can transition between a stowed position and a deployed position. For example, the antenna assembly comprises a plurality of the flexible layers that are foldable or rollable. At least partially folding or rolling such flexible layers of the antenna assembly results in the stowed position of the antenna assembly. Also, unrolling or unfolding the one or more of such flexible layers of the antenna assembly results in the deployed position of the antenna assembly. When the antenna assembly is in the stowed position, the antenna assembly has a relatively compact form factor, compared to that in the deployed position. Accordingly, the antenna assembly may be easier to transport from one geographical location or another (e.g., the antenna assembly is relatively more transportable), while in the stowed position. For example, the antenna assembly may be transported, while in the stowed position, within a backpack or on a satellite. The antenna assembly is rearranged in the deployed position, prior to operating the antenna assembly for radiating signals. The antenna assembly may be caused to transition between the stowed and deployed positions manually and/or using a motorized arrangement. In an example, such an antenna assembly may be aperture fed, e.g., to simplify power transfer to the patches.

In one embodiment, the antenna assembly comprises a first flexible layer including a ground plane on and above a first layer of dielectric material, and a plurality of feed lines on and below the first layer of dielectric material. The first flexible layer including the ground plane is flexible, such that the first flexible layer may be rollable or foldable. In an example, the ground plane has relatively less thickness (e.g., in the range of 0.1 mil to 10 mils (where a mil is 0.001 inches), as described below). In such an example, such a relatively small thickness of the ground plane allows the ground plane to be flexible and rollable. The ground plane comprises conductive material, such as one or more metals and/or alloys thereof. The first layer of dielectric material comprises an appropriate dielectric material that is rollable or foldable, such as a tape or a film of dielectric material. Example material for the first layer of dielectric material comprises polyimide tapes, and/or other type of flexible and rollable tapes or films of dielectric material. In an example, the first layer of dielectric material is flexible and rollable. In one embodiment, the ground plane includes a plurality of aperture slots, which are cuts or openings extending into the ground plane. In one embodiment, the first flexible layer further includes a plurality of feed lines on, and below the first layer of dielectric material. For example, each aperture slot may have a corresponding feedline below the aperture slot.

In one embodiment, the antenna assembly further comprises a second flexible layer including a first array of patches on a second layer of dielectric material; and a third flexible layer including a second array of patches on a third layer of dielectric material. In one embodiment, each of the first and second array of patches includes a plurality of patches comprising conductive material, such as metal. In some examples, individual patches of the first and second array of patches are flexible, such as rollable or foldable (e.g., see FIGS. 1A-1E, where the patches are rollable). In some other examples, individual patches of the first and second array of patches may not be flexible (e.g., see FIGS. 2A-2C, where the patches need not be flexible). In an example, the second and third layers of dielectric material are flexible, such as rollable or foldable.

FIGS. 1A-1E below describe examples in which the first, second, and third flexible layers are rollable. For example, the first, second, and third flexible layers are rollable around a first roller, a second roller, and a third roller, respectively. In such an example, in the stowed position, the first flexible layer is rolled around the first roller, the second flexible layer is rolled around the second roller, and the third flexible layer is rolled around the third roller. In the deployed position, the first flexible layer is at least partially unrolled from around the first roller, the second flexible layer is at least partially unrolled from around the second roller, and the third flexible layer is at least partially unrolled from around the third roller.

In an example, a first end of the first flexible layer is attached to the first roller, a first end of the second flexible layer is attached to the second roller, and a first end of the third flexible layer is attached to the third roller. Second ends of the first, second, and third flexible layers are attached to a support structure. In some examples, the support structure moves laterally with respect to the first, second, and third rollers, to cause corresponding rotational movement of the first, second, and third rollers, to thereby cause rolling or unrolling of the various flexible layers. FIGS. 1A-1E below describe example arrangements to cause lateral movement of the support structure, e.g., using a cogged roller and a cogged belt.

Figure 2A:
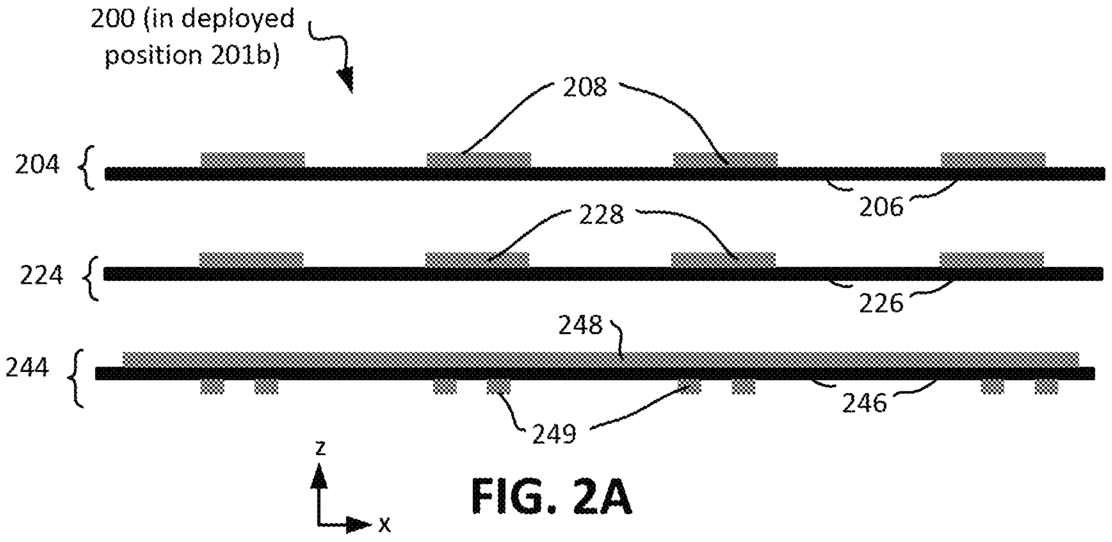
FIGS. 2A, 2B, and 2C illustrate various views of an antenna assembly, wherein the antenna assembly comprises (i) a first flexible layer including a ground plane on a first layer of dielectric material, (ii) a second flexible layer including a first array of conductive patches on a second layer of dielectric material, and (ii) a third flexible layer including a second array of conductive patches on a third layer of dielectric material, wherein the antenna assembly is foldable between stowed and deployed positions, in accordance with an embodiment of the present disclosure.
Figure 2B:
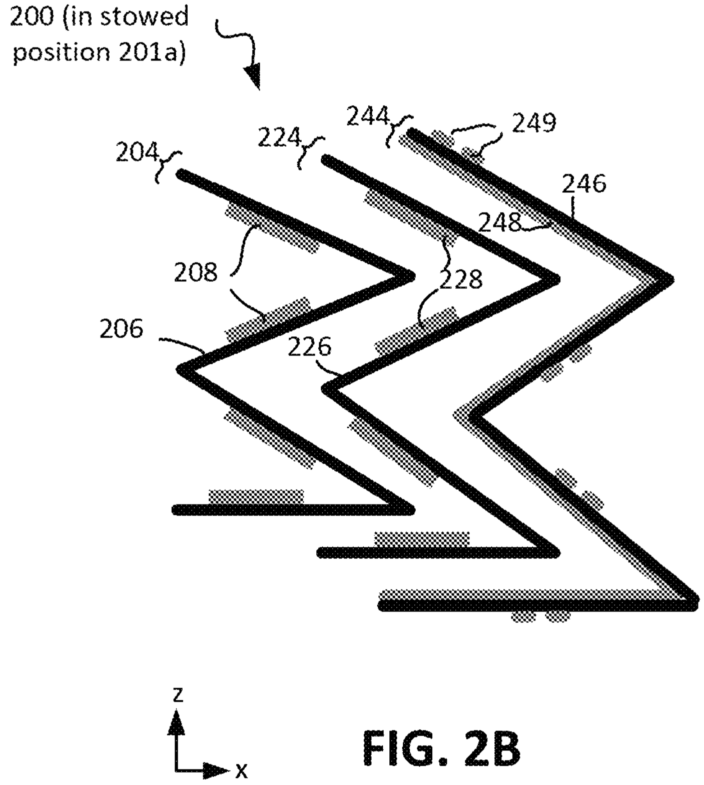
Figure 2C:
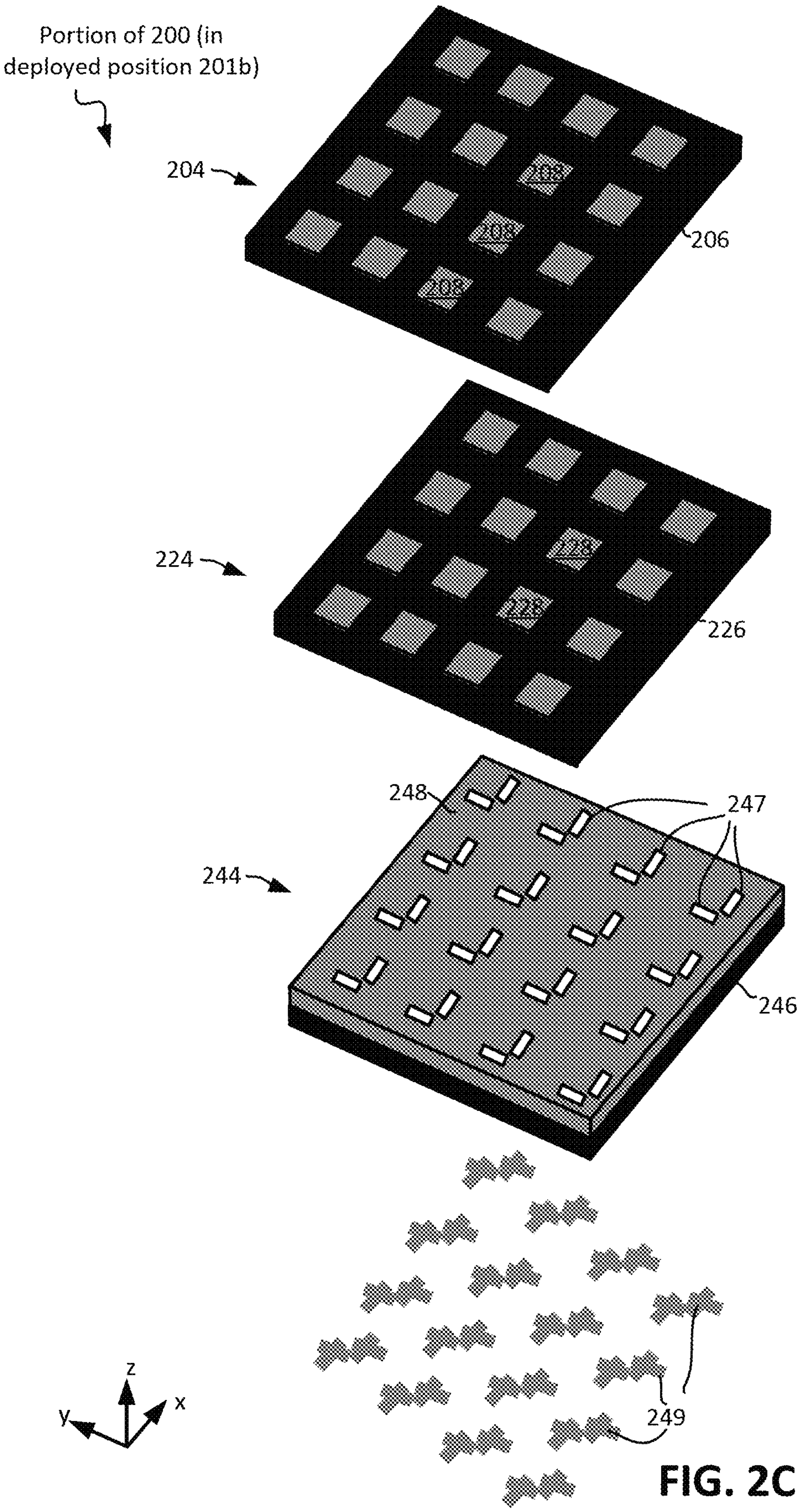

FIGS. 2A-2C below describe other examples in which the first, second, and third flexible layers are foldable. For example, the first, second, and third flexible layers are folded in the stowed position, and unfolded in the deployed position. As described above, the second flexible layer includes the first array of patches on the second layer of dielectric material; and the third flexible layer includes the second array of patches on the third layer of dielectric material. In an example, the patches may, or may not, be foldable. For example, the second flexible layer may be folded, by folding sections of the second layer of dielectric material, which are between patches of the first array of patches. Similarly, the third flexible layer may be folded, by folding sections of the third layer of dielectric material, which are between patches of the second array of patches. Numerous configurations and variations will be apparent in light of this disclosure.

Materials that are "compositionally different" or "compositionally distinct" as used herein refers to two materials that have different chemical compositions. This compositional difference may be, for instance, by virtue of an element that is in one material but not the other (e.g., copper is compositionally different than an alloy of copper), or by way of one material having all the same elements as a second material but at least one of those elements is intentionally provided at a different concentration in one material relative to the other material (e.g., two copper alloys each having copper and tin, but with different percentages of copper, are also compositionally different). If two materials are elementally different, then one of the materials has an element that is not in the other material (e.g., pure copper is elementally different than an alloy of copper).

The phrase "substantially" has been used throughout this disclosure. In an example, length A is substantially equal to length B implies that A and B are within 5% or within 3% or within 2% or within 1% of each other. In an example, angle P is substantially equal to angle Q implies that P and Q are within 5 degrees, or 3 degrees, or 2 degrees, or 1 degree of each other. A first line (or a first side of a feature) being substantially parallel to a second line (or a second side of a feature) implies that an angle between the two lines (or two sides) is at most 5 degrees, or at most 4 degrees, or at most 3 degrees, or at most 2 degrees, or at most 1 degree, for example. A first feature is substantially symmetrical to a second feature implies that various dimensions of the first feature and corresponding dimensions of the second feature are substantially the same (e.g., within 5% or within 3% or within 2% or within 1% of each other), and locations of the two features with respect to a plane of symmetry (such as a plane of symmetry 212 discussed herein below) are substantially the same (e.g., within 5% or within 3% or within 2% or within 1% of each other).

It should be readily understood that the meaning of "above" and "over" in the present disclosure should be interpreted in the broadest manner such that "above" and "over" not only mean "directly on" something but also include the meaning of over something with an intermediate feature or a layer therebetween. As will be appreciated, the use of terms like "above" "below" "beneath" "upper" "lower" "top" and "bottom" are used to facilitate discussion and are not intended to implicate a rigid structure or fixed orientation; rather such terms merely indicate spatial relationships when the structure is in a given orientation.

Architecture

Figure 1B:
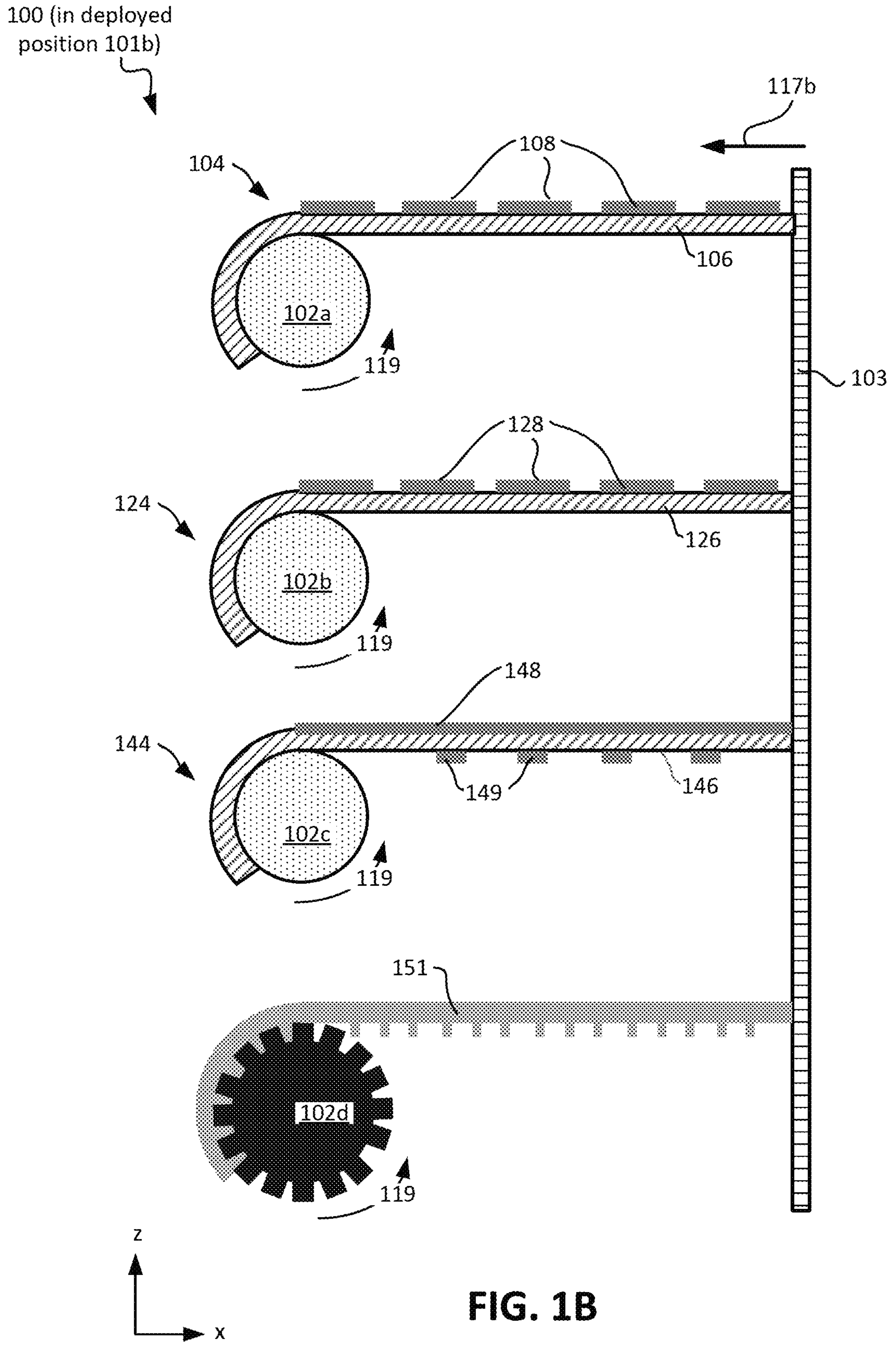
Figure 1C:
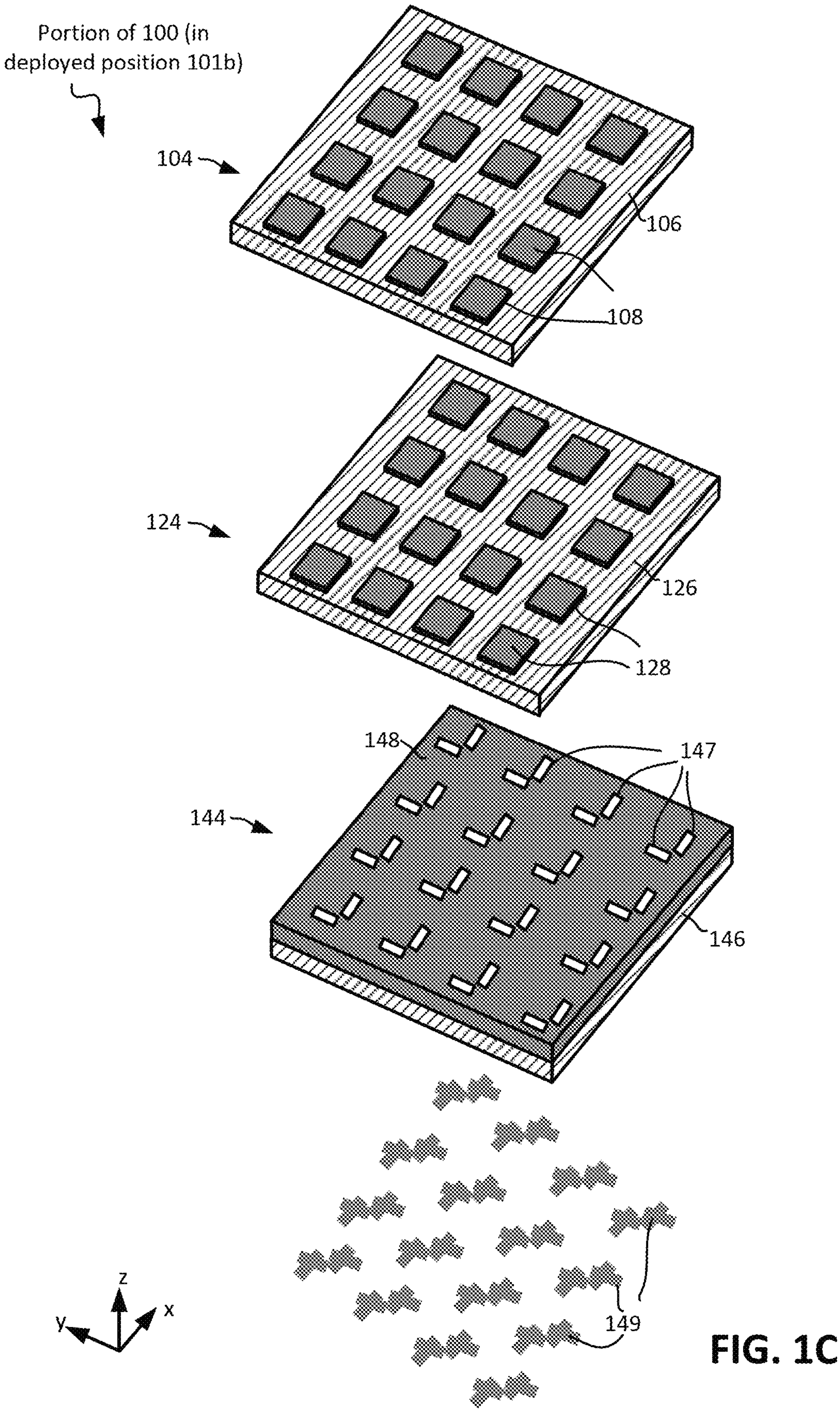
Figure 1D:
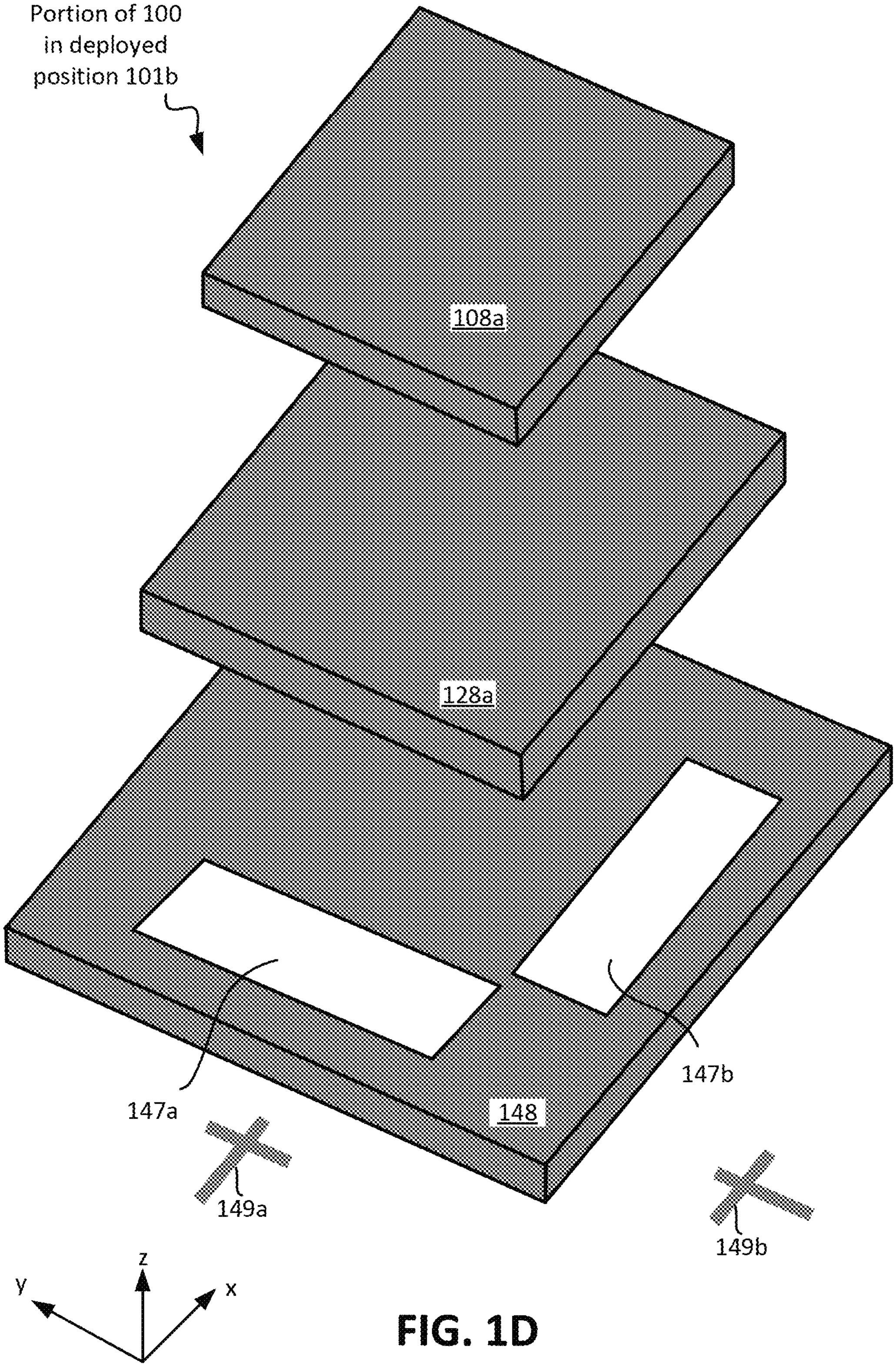
Figure 1E:
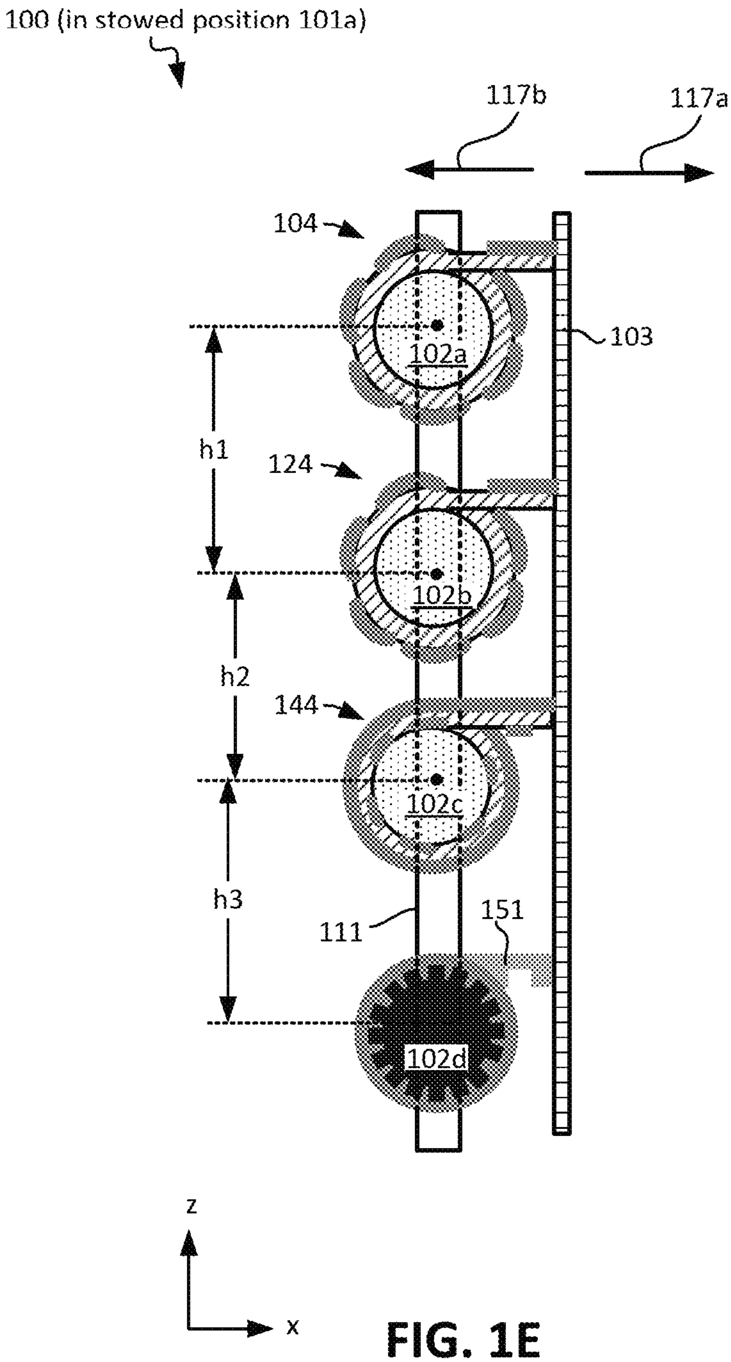

FIG. 1A illustrates cross-sectional view of an antenna assembly 100 in a stowed position 101*a*, FIG. 1B illustrates cross-sectional view of the antenna assembly 100 in a deployed position 101*b*, and FIG. 1C illustrates an exploded view of a section of the antenna assembly 100 in the deployed position 101*b*, wherein the antenna assembly 100 comprises (i) a first flexible layer 144 including a ground plane 148 on a first layer of dielectric material 146, (ii) a second flexible layer 124 including a first array of conductive patches 128 on a second layer of dielectric material 126, and (ii) a third flexible layer 104 including a second array of conductive patches 108 on a third layer of dielectric material 106, wherein the antenna assembly 100 is rollable to provide the stowed position 101*a* for the antenna assembly 100 and the deployed position 101*b* for the antenna assembly 100, in accordance with an embodiment of the present disclosure. FIG. 1D illustrates an exploded of a portion of the antenna assembly 100 in the deployed position 101*b*, in accordance with an embodiment of the present disclosure. FIG. 1E illustrates a support structure 111 that laterally affixes rollers 102*a*, 102*b*, 102*c*, 102*d* of the antenna assembly 100, in accordance with an embodiment of the present disclosure.

Note that in the exploded view of FIG. 1C, only a section of the layers 104, 124, and 144 are illustrated, without illustrating some other components of the antenna assembly 100, such as the rollers 102*a*, . . . , 102*d*, belt 151, and support structures 103, 111. Similarly, in the exploded view of FIG. 1D, a single patch 128*a* of the array of conductive patches 128, a single patch 108*a* of the array of conductive patches 108, a section of the ground plane 148, and two feed lines 149*a*, 149*b* below the patches 108*a*. 128*a* and the ground plane 148 are illustrated. Also note that in FIG. 1D, some components of the antenna assembly 100, such as layers of dielectric material 106, 126, and 146, the rollers 102*a*, . . . , 102*d*, the belt 151, some of the patches 108, 128, and support structures 103, 111 are not illustrated.

Referring to FIGS. 1A-1E, the antenna assembly 100 comprises the flexible layer 104, which includes the array of patches 108 on the layer of dielectric material 106. In one embodiment, the layer 104 is rollable around a roller 102*a*. The roller 102*a* rotates around a corresponding axis of rotation.

In an example, the roller 102*a* is a passive roller. For example, there may not be a motorized or handheld arrangement to directly rotate the roller 102*a*. In an example, the roller 102*a* is affixed to a support structure 111 (see FIG. 1E, where the support structure 111 is not illustrated in FIGS. 1A-1D for purposes of illustrative clarity), and rotates around a corresponding axis of rotation while being affixed to the support structure 111. The support structure 111 avoids or at least reduces lateral movement of any of the rollers 102*a*, . . . , 102*d* with respect to any other of the rollers 102*a*, . . . , 102*d*. In an example, the roller 102*a* rotates, based on a lateral movement of the support structure 103 with respect to the rollers 102*a*, . . . , 102*d*, as describe below.

In the stowed position 101*a* of the antenna assembly 100, the layer 104 is at least in part rolled around the roller 102*a*, as illustrated in FIG. 1A. In the deployed position 101*b* of the antenna assembly 100, the layer 104 is at least in part unrolled from the roller 102*a*, as illustrated in FIG. 1B. As described above, the layer 104 is flexible, which allows the layer 104 to be rolled around the roller 102*a*.

The array of patches 108 of the layer 104 includes a plurality of conductive and radiating patches (e.g., for transmitting and/or receiving RF signals), which are visible in the exploded view of FIG. 1C. For example, FIG. 1C illustrates an array of 4×4 patches 108, e.g., a total of 16 patches 108. However, the array of patch 108 can include any different number and/or configuration of the patches.

The thickness of individual patches of the array of patches 108 is in the range of 0.1 mil to 10 mils (where a mil is 0.001 inches), or in the subrange of 0.1 to 8 mils, or 0.1 to 5 mils, or 0.1 to 2 mils, or 0.5 to 10 mils, or 0.5 to 5 mils, or 0.5 to 2 mils, or 1 to 2 mils, for example.

In an example, such a relatively low thickness of the patches 108 allows the patches 108 to be flexible and rollable. In an example, the patches 108 are flexible and rollable, such that they are rolled around the roller 102*a*.

However, in another example, the patches 108 may be rigid or semi-rigid, such as not flexible. In such an example, the patches 108 fully or at least partially maintain their respective shape, when the layer 104, including the layer of dielectric material 106 and the patches 108, is rolled around the roller 102*a*.

In an example, the patches 108 comprise conductive material, such as one or more metals and/or alloys thereof. Example metals for the patches 108 include copper, silver, nickel, gold, aluminum, and/or other one or more appropriate metals. In an example, the patches 108 comprises a film or a tape of conductive material, or a printed conductive ink (such as a copper ink or another metal ink deposited on the layer of dielectric material 106). In an example, the conductive material of the patches 108 are attached to the layer of dielectric material 106 using an appropriate adhesive material.

In an example, the layer of dielectric material 106 comprises an appropriate dielectric material that is rollable, such as a tape or a film of dielectric material. Example material for the layer of dielectric material 106 comprises polyimide, such as polyimide tapes or films, and/or other type of flexible and rollable tapes or films of dielectric material.

In an example, a thickness of the layer of dielectric material 106 is small enough, such that the layer of dielectric material 106 is flexible and rollable. The thickness of the layer of dielectric material 106 is in the range of 0.1 mil to 10 mils, or in the subrange of 0.1 to 8 mils, or 0.1 to 5 mils, or 0.1 to 2 mils, or 0.5 to 10 mils, or 0.5 to 5 mils, or 0.5 to 2 mils, or 1 to 2 mils, for example.

The antenna assembly 100 further comprises the flexible layer 124, which includes the array of patches 128 on the layer of dielectric material 126. In one embodiment, the layer 124 is rollable around a roller 102*b*. The roller 102*b* rotates around a corresponding axis of rotation.

In an example, the roller 102*b* is a passive roller. For example, there may not be a motorized or handheld arrangement to directly rotate the roller 102*b*. In an example, the roller 102*b* is affixed to a support structure 111 (see FIG. 1E), and rotates around a corresponding axis of rotation while being affixed to the support structure 111. The support structure 111 avoids or at least reduces lateral movement of any of the rollers 102*a*, . . . , 102*d* with respect to any other of the rollers 102*a*, . . . , 102*d*. In an example, the roller 102*b* rotates, based on a lateral movement of the support structure 103 with respect to the rollers 102*a*, . . . , 102*d*, as describe below.

In the stowed position 101*a* of the antenna assembly 100, the layer 124 is at least in part rolled around the roller 102*b*, as illustrated in FIG. 1A. In the deployed position 101*b* of the antenna assembly 100, the layer 124 is at least in part unrolled from the roller 102*b*, as illustrated in FIG. 1B. As described above, the layer 124 is flexible, which allows the layer 124 to be rolled around the roller 102*b*.

The array of patches 128 includes a plurality of conductive and radiating patches, which are visible in the exploded view of FIG. 1C. For example, FIG. 1C illustrates an array of 4×4 patches 128, e.g., a total of 16 patches. However, the array of patch 128 can include any different number and/or configuration of patches.

The thickness of individual patches of the array of patches 128 is in the range of 0.1 mil to 10 mils, or in the subrange of 0.1 to 8 mils, or 0.1 to 5 mils, or 0.1 to 2 mils, or 0.5 to 10 mils, or 0.5 to 5 mils, or 0.5 to 2 mils, or 1 to 2 mils, for example.

In an example, such a relatively low thickness of the patches 128 allows the patches 128 to be flexible and rollable. In an example, the patches 128 are flexible and rollable, such that they are rolled around the roller 102*b*.

However, in another example, the patches 128 may be rigid or semi-rigid, such as not flexible. In such an example, the patches 128 fully or at least partially maintain their respective shape, when the layer 124, including the layer of dielectric material 126 and the patches 128, is rolled around the roller 102*b*.

In an example, the patches 128 comprises conductive material, such as one or more metals and/or alloys thereof. Example metals for the patches 128 include copper, silver, nickel, gold, aluminum, and/or other one or more appropriate metals. In an example, the patches 128 comprises a film or a tape of conductive material, or a printed conductive ink (such as a copper ink or another metal ink deposited on the layer of dielectric material 126). In an example, the conductive material of the patches 128 are attached to the layer of dielectric material 106 using an appropriate adhesive material.

In an example, the layer of dielectric material 126 comprises an appropriate dielectric material that is rollable, such as a tape or a film of dielectric material. Example material for the layer of dielectric material 126 comprises polyimide, or other type of flexible and rollable tapes or films of dielectric material. In an example, a thickness of the layer of dielectric material 126 is small enough, such that the layer of dielectric material 126 is flexible and rollable. The thickness of the layer of dielectric material 126 is in the range of 0.1 mil to 10 mils, or in the subrange of 0.1 to 8 mils, or 0.1 to 5 mils, or 0.1 to 2 mils, or 0.5 to 10 mils, or 0.5 to 5 mils, or 0.5 to 2 mils, or 1 to 2 mils, for example.

Thus, two flexible layers 104, 124 including two arrays of patches 108, 128 are illustrated in FIGS. 1A-1E. However, there may be different number of such flexible layers including the patches, such as only one layer including an array of patches, in an example. In such an example, one the of two flexible layers 104 and 124 may be absent. In another example, there may be three, four, or higher number of such flexible layers.

In one embodiment, the antenna assembly 100 further comprises the flexible layer 144, which includes the ground plane 148 on a layer of dielectric material 146. In one embodiment, the layer 144 is rollable around a roller 102*c*. The roller 102*c* rotates around a corresponding axis of rotation.

In an example, the roller 102*c* is a passive roller. For example, there may not be a motorized or handheld arrangement to directly rotate the roller 102*c*. In an example, the roller 102*c* is affixed to the support structure 111 (see FIG. 1E), and rotates around a corresponding axis of rotation while being affixed to the support structure 111. The support structure 111 avoids or at least reduces lateral movement of any of the rollers 102*a*, . . . , 102*d* with respect to any other of the rollers 102*a*, . . . , 102*d*. In an example, the roller 102*a* rotates, based on a lateral movement of the support structure 103 with respect to the rollers 102*a*, . . . , 102*d*, as describe below.

In the stowed position 101*a* of the antenna assembly 100, the layer 144 is at least in part rolled around the roller 102*c*, as illustrated in FIG. 1A. In the deployed position 101*b* of the antenna assembly 100, the layer 144 is at least in part unrolled from the roller 102*c*, as illustrated in FIG. 1B.

As described above, the layer 144 is flexible, which allows the layer 144 to be rolled around the roller 102*c*. The thickness of the ground plane 148 is in the range of 0.1 mil to 10 mils (where a mil is 0.001 inches), or in the subrange of 0.1 to 8 mils, or 0.1 to 5 mils, or 0.1 to 2 mils, or 0.5 to 10 mils, or 0.5 to 5 mils, or 0.5 to 2 mils, or 1 to 2 mils, for example. In an example, such a relatively low thickness of the ground plane 148 allows the ground plane 148 to be flexible and rollable.

In an example, the ground plane 148 comprises conductive material, such as one or more metals and/or alloys thereof. Example metals for the ground plane 148 include copper, silver, nickel, gold, aluminum, and/or other one or more appropriate metals. In an example, the ground plane 148 comprises a film or a tape of conductive material, or a printed conductive ink (such as a copper ink or another metal ink deposited on the layer of dielectric material 146). Note that in an example, there is a single and common ground plane below the array of patches 108, and the array of patches 128. In an example, the conductive material of the ground plane 148 is attached to the layer of dielectric material 146 using an appropriate adhesive material.

In an example, the layer of dielectric material 146 comprises an appropriate dielectric material that is rollable, such as a tape or a film of dielectric material. Example material for the layer of dielectric material 146 comprises polyimide tapes, or other type of flexible and rollable tapes or films of dielectric material. In an example, a thickness of the layer of dielectric material 146 is small enough, such that the layer of dielectric material 146 is flexible and rollable. The thickness of the layer of dielectric material 146 is in the range of 0.1 mil to 10 mils (where a mil is 0.001 inches), or in the subrange of 0.1 to 8 mils, or 0.1 to 5 mils, or 0.1 to 2 mils, or 0.5 to 10 mils, or 0.5 to 5 mils, or 0.5 to 2 mils, or 1 to 2 mils, for example.

In one embodiment, the ground plane 148 includes a plurality of aperture slots 147. The slots 147 are visible in the exploded view of FIGS. 1C-1D. The aperture slots 147 (also referred to herein as slots 147) are cut into the ground plane 148. Thus, a slot 147 is a hole or an opening that extends through the ground plane 148. The slots 148 are illustrated using while color. However, the layer of dielectric material 146 below the ground plane 148 may be visible through the slots 147.

As illustrated in FIGS. 1B-1E, each patch of the patches 108 is above a corresponding patch of the patches 128. For example, FIG. 1C illustrates a 4×4 array of patches 108 and a 4×4 array of patches 128, where each patch of the patches 108 is above, and at least in part aligned with, a corresponding patch of the patches 128. FIG. 1D illustrates a specific patch 108*a* of the array of patches 108 above, and at least in part aligned with, a specific patch 128*a* of the array of patches 128.

Each patch 108 and a corresponding patch 128 have two corresponding aperture slots 147 within the ground plane 148 and below the patches. For example, in FIG. 1D, the patch 128*a* is below the patch 108*a*, and two aperture slots 147*a* and 147*b* are below the patches 108*a*, 128*a*. Similarly, each patch of the array of patches 108 will have two corresponding aperture slots below the patch.

In one embodiment, the flexible layer 144 further includes a plurality of feed lines 149 on, and below the layer of dielectric material 146. Two example feed lines 149*a* and 149*b* are visible in the exploded view of FIG. 1C. For example, the feed lines 149 are separated from the ground plane 148 by the layer of dielectric material 146.

As illustrated in FIG. 1D, each aperture slot 147 has a corresponding feedline 149 below the aperture slot 147. For example, as illustrated in FIG. 1D, the feedline 149*a* is below the aperture slot 147*a*, and the feedline 149*b* is below the aperture slot 147*b*. Thus, the feedline 149*a* and the aperture slot 147*a* are at least in part aligned, and the feedline 149*b* and the aperture slot 147*b* are at least in part aligned.

In one embodiment, the feed lines 149*a*, 149*b* are symmetrical with respect to each other, and similarly, the aperture slots 147*a*, 147*b* are symmetrical with respect to each other. However, in another example, no such symmetry may also be possible.

Thus, in the example of FIG. 1C, there are 4×4, or 16 number of patches 108, and similarly, 16 number of patches 128. Accordingly, there are 32 number of aperture slots 147, and corresponding 32 number of feed lines 149.

Referring to FIG. 1D, in an example, one of the feed lines 149*a*, 149*b* and the corresponding one of the aperture slots 147*a*, 147*b* are used for vertical polarization signals, and the other of the feed lines 149*a*, 149*b* and the corresponding other one of the aperture slots 147*a*, 147*b* are used for horizontal polarization signals. Thus, the antenna assembly is a dual polarized antenna assembly 100.

The aperture slots 147*a* and 147*b* respectively couple the feed lines 149*a*, 149*b* to the radiating patches 108*a*, 128*a*, and cause to excite the patches 108*a*, 128*a*, thereby causing transmission of RF signals by the patches 108*a*, 128*a*. Thus, the two stacked patches 108*a*, 128*a*, a section of the ground plane 148 with the aperture slots 147*a*, 147*b*, and the feedlines 149*a*, 149*b* form a dual polarized, aperture fed, stacked patch antenna. The antenna assembly 100 comprises such an array of dual polarized, aperture fed, stacked patch antennas, such as 4×4, or 16 such dual polarized, aperture fed, stacked patch antennas.

Referring now to FIG. 1E, the rollers 102*a*, . . . , 102*d* are mounted to the rigid support structure 111 in a spaced fashion. For example, a center of the roller 102*a* is at a vertical height h1 from a center of the roller 102*b*; the center of the roller 102*b* is at a vertical height h2 from a center of the roller 102*c*; and the center of the roller 102*c* is at a vertical height h3 from a center of the roller 102*d*. In an example, the heights h1 and h2 may be configurable, and tunable to adjust parameters of the antenna assembly 100 (such as to adjust frequency response curve of the antenna assembly 100). In an example, h1 and h2 may be substantially the same (e.g., within 25 mils of each other, or within 10 mils of each other, or within 5 mils of each other). In another example, h1 and h2 may be different. In an example, the height h3 may be based on mechanical factors, such as a desired overall height of the antenna assembly 100.

Also illustrated in FIGS. 1A, 1B, and 1E is a support structure 103, which may be a rigid dielectric material structure, for example. An end of the layer 104 (e.g., right end, in the example of FIGS. 1A-1B) is attached to the support structure 103, and another end of the layer 104 is attached to the roller 102*c*. Similarly, an end of the layer 124 is attached to the support structure 103, and another end of the layer 124 is attached to the roller 102*a*. Similarly, an end of the layer 144 is attached to the support structure 103, and another end of the layer 144 is attached to the roller 102*c*.

In an example, the support structure 103 is movable with respect to the rollers 102*a*, 102*b*, 102*c*. 102*d*. For example, movement of the support structure 103 with respect to the rollers 102*a*, 102*b*, 102*c*, 102*d* causes the antenna assembly 100 to transition between the stowed position 101*a* and the deployed position 101*b*.

A lateral movement of the support structure 103 causes rolling or unrolling of the layers 104, 124, 144 around the rollers 102*a*, 102*b*, 102*c*, respectively, and a corresponding rotation of the rollers 102*a*, 102*b*, 102*c*. For example, FIG. 1B illustrates an example lateral direction 117*b* of movement of the support structure 103, and a corresponding rotational direction 119 of the rollers 102*a*, 102*b*, 102*c*.

For example, when in the stowed position 101*a*, a direction 117*a* of lateral movement of the support structure 103 is illustrated in FIG. 1A, where the support structure 103 is movable along the direction 117*a* to transition from the stowed position 101*a* to the deployed position 101*b*.

Similarly, when in the deployed position 101*b*, a direction 117*b* of lateral movement of the support structure 103 is illustrated in FIG. 1B, where the support structure 103 is movable along the direction 117*b* to transition from the deployed position 101*b* to the stowed position 101*a*.

Note that the stowed position 101*a* refers to a position where the layers 104, 124, 144 are at least partially or fully rolled around the corresponding rollers 102*a*. 102*b*, 102*c*, respectively. Similarly, the deployed position 101*b* refers to a position where the layers 104, 124, 144 are at least partially or fully unrolled from the corresponding rollers 102*a*. 102*b*, 102*c*, respectively. Note that there are a large number of possible positions of the antenna assembly 100, e.g., depending on an extent of the rolling or unrolling of the layers 104, 124, 144.

Note that the rollers 102*a*, 102*b*, 102*c*, 102*d* cannot laterally move with respect to each other. For example, FIG. 1E illustrates the support structure 111 that laterally affixes rollers 102*a*, 102*b*, 102*c*. 102*d* of the antenna assembly 100 with respect to each other. The support structure 111 is not illustrated in FIGS. 1A-1B for purposes of illustrative clarity.

A center of each of the rollers 102*a*, . . . , 102*d* are attached to the support structure 111. This allows the rollers 102*a*, . . . , 102*d* to roll around their respective axis of rotations, but not laterally move with respect to each other. This ensures that the patches 108, 128, the corresponding aperture slots 147, and the feedlines 149 are aligned with respect to each other, when the antenna assembly 100 is deployed (see FIG. 1D for alignment of the patches 108*a*, 128*a*, the aperture slots 147*a*, 147*b*, and the feedlines 149*a*, 149*b*). Thus, when the support structure 103 moves laterally with respect to the rollers 102*a*, . . . , 102*d*, the support structure 111 prevents or reduces chances of lateral movement between the rollers 102*a*, . . . , 102*d* (e.g., prevents or reduces chances of any of a roller to move laterally with respect to any of the other rollers).

FIGS. 1A, 1B, and 1E further illustrates an arrangement of laterally moving the support structure 103 with respect to the rollers 102a, . . . , 102c, where the arrangement comprises the roller 102d and a belt 151.

For example, as described above, the rollers 102a, 102b, 102c are passive rollers, and the roller 102d is a cogged drive roller. In an example, the belt 151 is a cogged drive belt. The cogged drive roller 102d may include, or otherwise be coupled with, a servo or motor that causes the roller 102d to rotate about the axis of rotation of the roller 102d. In another example, the cogged drive roller 102d may be rotated by hand.

With a rotation of the roller 102d, the belt 151 moves the support structure 103 laterally either in directions 117a or 117b, e.g., depending on a direction of the rotation of the roller 102d. The belt 151, in an example, is semi-rigid, so that it can roll around the roller 102d, as well as push or pull the support structure 103 towards, or further away, from the roller 102d.

With the lateral movement of the support structure 103 with respect to the support structure 111 and the rollers 102a, . . . , 102d in directions 117a or 117b, the rollers 102a, . . . , 102c also correspondingly rotate, thereby transitioning the antenna assembly 100 between the stowed position 101a and the deployed position 101b, or any position therebetween.

In an example, the rollers 102a, . . . , 102d are mechanically coupled (e.g., through gears), such that any rotation of the roller 102d also causes corresponding rotation of the rollers 102a, . . . , 102c. Thus, rotating the roller 102d causes rolling and/or unrolling of the various flexible layers 104, 124, 144, and/or lateral movement of the support structure 103.

Note that while FIGS. 1A-1B and 1E illustrate an example arrangement to rotate the rollers 102a, . . . , 102c (e.g., using the roller 102d), the rollers 102a, . . . , 102c can be rotated using any other appropriate technique. For example, any appropriate arrangement can cause lateral movement of the support structure 103 with respect to the support structure 111 and the rollers 102a, . . . , 102d, which may then cause corresponding rotation of the rollers 102a, . . . , 102c, and which may resultantly cause transition of the antenna assembly 100 between the stowed position 101a and the deployed position 101b, or any position therebetween.

FIG. 2A illustrates cross-sectional view of an antenna assembly 200 in a deployed position 201a, FIG. 2B illustrates cross-sectional view of the antenna assembly 200 in a stowed position 201b, and FIG. 2C illustrates exploded view of the antenna assembly 200 in the deployed position 201a, wherein the antenna assembly 200 comprises (i) a first flexible layer 244 including a ground plane 248 on a first layer of dielectric material 246, (ii) a second flexible layer 224 including a first array of conductive patches 228 on a second layer of dielectric material 226, and (ii) a third flexible layer 204 including a second array of conductive patches 208 on a third layer of dielectric material 206, wherein the antenna assembly 200 is foldable to provide the stowed position 201a for the antenna assembly 200 and the deployed position 201b for the antenna assembly 200, in accordance with an embodiment of the present disclosure. Note that the layers of dielectric material 206, 226, 246 are illustrated in solid black shadings in FIG. 2A-2C, while the layers of dielectric material 106, 126, 146 are illustrated using diagonal line shadings in FIG. 1A-1E.

Referring to FIGS. 2A-2C, the antenna assembly 200 comprises the flexible layer 204, which includes the array of patches 208 on the layer of dielectric material 206. In the example of FIGS. 2A-2C, the patches 208 may be rigid, semi-rigid, or flexible. For example, in the stowed position of FIG. 2B, the patches 208 are not folded. Rather, sections of the layer dielectric material 206, which are in between the patches 208, are folded. Accordingly, at least the sections of the layer dielectric material 206, which are in between the patches 208, are flexible and foldable.

The array of patches 208 of the layer 204 includes a plurality of conductive and radiating patches, which are visible in the exploded view of FIG. 2C. For example, FIG. 2C illustrates an array of 4×4 patches 208, e.g., a total of 16 patches 208. However, the array of patch 208 can include any different number and/or configuration of the patches.

The thickness and/or conductive material of individual patches of the array of patches 208 may be similar to those of patches 108 and/or 128 of the antenna assembly 100 described above. In an example, the layer of dielectric material 206 may be similar to the dielectric material 106 of the antenna assembly 100 described above.

The antenna assembly 200 further comprises the flexible layer 224, which includes the array of patches 228 on the layer of dielectric material 226. The flexible layer 224 would be apparent, based on the above description with respect to the flexible layer 204.

Two flexible layers 204, 224 including two arrays of patches 208, 228 are illustrated in FIGS. 2A-2C. However, there may be different number of such flexible layers including the patches, such as one layer, three layers, or a higher number of such flexible layers.

In one embodiment, the antenna assembly 200 further comprises the flexible layer 244, which includes the ground plane 248 on a layer of dielectric material 246. In an example, the ground plane 248 may be foldable, as illustrated in FIG. 2B. The thickness and/or material of the ground plane 248 may be similar to those described above with respect to the ground plane 148 of the antenna assembly 100. Similarly, a thickness and/or material of the layer of dielectric material 246 may be similar to those described above with respect to the layer of dielectric material 146 of the antenna assembly 100.

In one embodiment, the ground plane 248 includes a plurality of aperture slots 247, e.g., as illustrated in the exploded view of FIG. 2C. The aperture slots 247 will be apparent, based on the description above with respect to the aperture slots 147 of the antenna assembly 100.

As illustrated in FIGS. 2A and 2C, in the deployed position 201b, each patch of the patches 208 is above a corresponding patch of the patches 228. For example, FIG. 2C illustrates a 4×4 array of patches 208 and a 4×4 array of patches 228, where each patch of the patches 208 is above, and at least in part aligned with, a corresponding patch of the patches 228. Such alignment of stacked patches has also been described above with respect to the antenna assembly 100.

In one embodiment, the flexible layer 244 further includes a plurality of feed lines 249 on, and below the layer of dielectric material 246. The feed lines 249 will be apparent, based on the description above with respect to the feed lines 149 of the antenna assembly 100.

Description of the antenna assembly 100, unless otherwise stated and unless contrary to FIGS. 2A-2C, are also applicable to the antenna assembly 200 of FIG. 2A-2C. For example, the antenna assembly 200 comprises an array of (such as a 4×4 array of) dual polarized, aperture fed, stacked patch antennas.

The antenna assembly 100 of FIGS. 1A-1E is a rollable antenna assembly. In contrast, the antenna assembly 200 of FIGS. 2A-2C is a foldable antenna assembly. For example, as illustrated in FIG. 2B, in the stowed position 101*b*, the antenna assembly 200 may be folded. An example folding of the antenna assembly 200 is illustrated in FIG. 2B, where sections of the layers of dielectric material 206 and 226, which are between the corresponding patches 208 and 228, respectively, are folded. However, in another example, the patches 208, 228 may also be foldable, e.g., to realize an even more compact folded and stowed position of the antenna assembly 200. In an example, the folding of the antenna assembly 100 can be performed manually and/or using a motorized arrangement to fold multiple stacked and flexible layers.

Method of Operation

Figure 3:
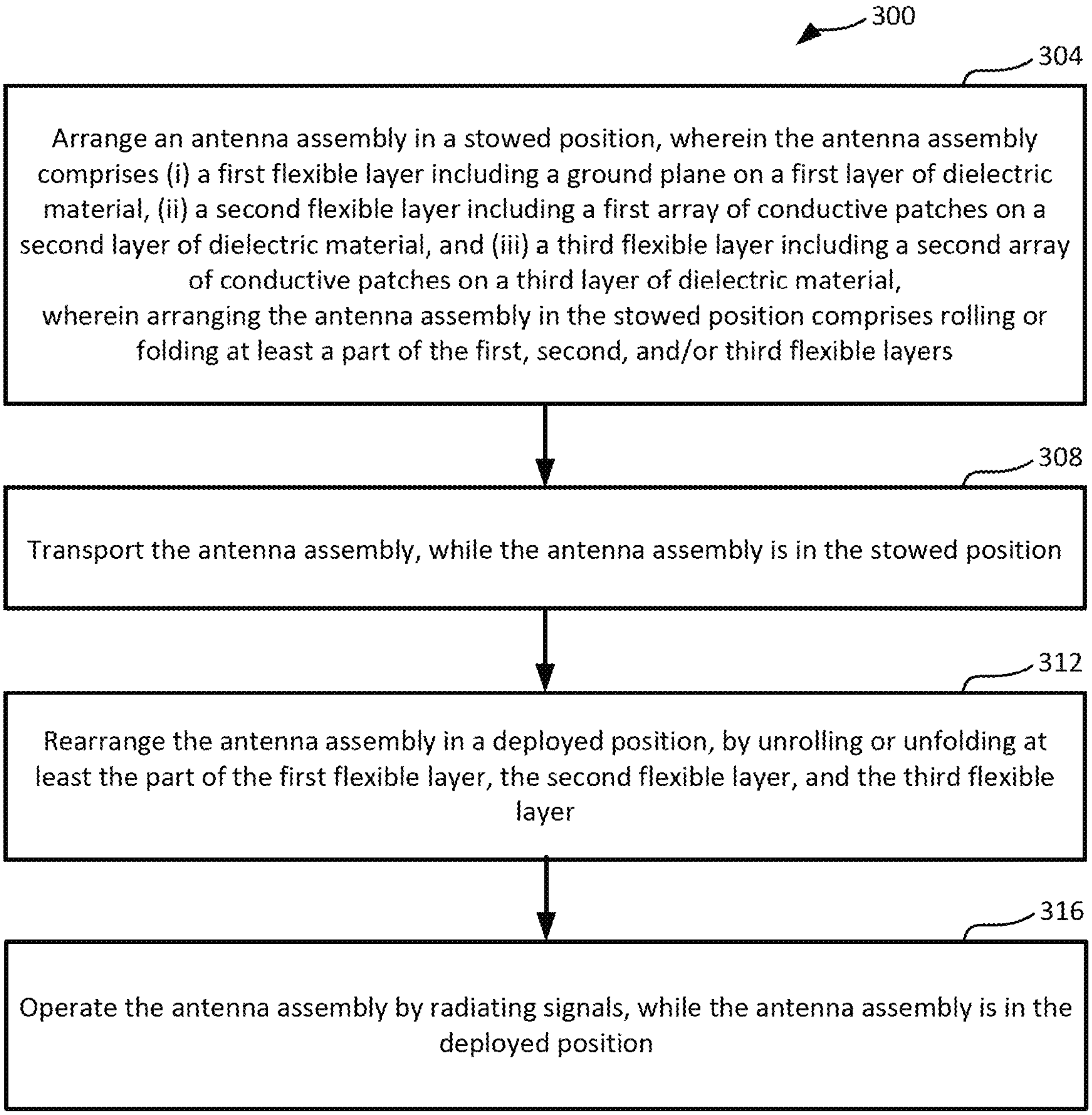
FIG. 3 illustrate a flowchart depicting a method of operating an example antenna assembly (such as the antenna assembly of FIGS. 1A-2C), in accordance with an embodiment of the present disclosure.

FIG. 3 illustrate a flowchart depicting a method 300 of operating an example antenna assembly (such as the antenna assembly of FIGS. 1A-2C), in accordance with an embodiment of the present disclosure.

At 304 of the method 300, an antenna assembly (such as the antenna assembly 100 or 200 of FIGS. 1A-2C) is arranged in a stowed position (such as the stowed position 101*a* or 201*a* described above). As described above, in an example, the antenna assembly comprises (i) a first flexible layer (e.g., flexible layer 144 or 244 described above) including a ground plane on a first layer of dielectric material, (ii) a second flexible layer (e.g., flexible layer 124 or 224 described above) including a first array of conductive patches on a second layer of dielectric material, and (iii) a third flexible layer (e.g., flexible layer 104 or 204 described above) including a second array of conductive patches on a third layer of dielectric material. In an example, arranging the antenna assembly in the stowed position comprises rolling or folding at least a part of the first, second, and/or third flexible layers. For example, FIGS. 1A-1E describe rolling the flexible layers 104, 124, and 144, to arrange the antenna assembly 100 in the stowed position 101*b*; and FIGS. 2A-2C describe folding the flexible layers 204, 224, and 244, to arrange the antenna assembly 200 in the stowed position 201*b*.

The method 300 proceeds from 304 to 308. At 308, the antenna assembly may be transported from one location to another, while the antenna assembly is in the stowed position. For example, in the stowed position, the antenna assembly has a more compact shape than when the antenna assembly is in the deployed position. This makes the antenna assembly easier to transport in the stowed position, than in the deployed position.

The method 300 proceeds from 308 to 312. At 312, the antenna assembly may be rearranged in the deployed position, by unrolling or unfolding at least the part of the first flexible layer, the second flexible layer, and the third flexible layer. For example, FIGS. 1A-1E describe unrolling the flexible layers 104, 124, and 144, to arrange the antenna assembly 100 in the deployed position 101*a*; and FIGS. 2A-2C describe unfolding the flexible layers 204, 224, and 244, to arrange the antenna assembly 200 in the deployed position 201*a*.

The method 300 proceeds from 312 to 316. At 316, the antenna assembly may be made operational, e.g., where the antenna assembly radiates signals using the stacked array of patches. In an example, the antenna assembly is operational, while the antenna assembly is in the deployed position.

Note that the processes in method 300 are shown in a particular order for ease of description. However, one or more of the processes may be performed in a different order or may not be performed at all (and thus be optional), in accordance with some embodiments. Numerous variations on method 300 and the techniques described herein will be apparent in light of this disclosure.

Further Examples

The following examples pertain to further examples, from which numerous permutations and configurations will be apparent.

Example 1. An antenna assembly comprising: a first flexible layer including a conductive ground plane on a first layer of dielectric material; and a second flexible layer including an array of conductive patches on a second layer of dielectric material; wherein the first and second flexible layers are rollable or foldable, to provide a stowed position for the antenna assembly and a deployed position for the antenna assembly.

Example 2. The antenna assembly of example 1, comprising: a first roller configured to rotate around a first axis of rotation, wherein (i) in the stowed position, the first flexible layer including the ground plane and the first layer of dielectric material is rolled around the first roller, and (ii) in the deployed position, the first flexible layer including the ground plane and the first layer of dielectric material is at least partially unrolled from the first roller; and a second roller configured to rotate around a second axis of rotation, wherein (i) in the stowed position, the second flexible layer including the array of conductive patches and the second layer of dielectric material is rolled around the second roller, and (ii) in the deployed position, the second flexible layer including the array of conductive patches and the second layer of dielectric material is at least partially unrolled from the second roller.

Example 3. The antenna assembly of example 2, wherein in the deployed position, the array of conductive patches of the second flexible layer is above and separated from the ground plane of the first flexible layer.

Example 4. The antenna assembly of any one of examples 2-3, comprising: a support structure; wherein a first end of the first flexible layer including the ground plane and the first layer dielectric material is attached to the first roller, and a second end of the first flexible layer including the ground plane and the first layer dielectric material is attached to the support structure; and wherein a first end of the second flexible layer including the array of conductive patches and the second layer dielectric material is attached to the second roller, and a second end of the second flexible layer including the array of conductive patches and the second layer dielectric material is attached to the support structure.

Example 5. The antenna assembly of example 4, wherein: the first and second rollers are mounted in a fixed position, and the support structure is laterally movable relative to the first and second rollers.

Example 6. The antenna assembly of any one of examples 4-5, comprising: a motor configured to cause lateral movement of the support structure relative to the first and second rollers.

Example 7. The antenna assembly of any one of examples 4-6, wherein a lateral movement of the support structure causes the first and second rollers to rotate, and causes the antenna assembly to transition between the stowed and deployed positions.

Example 8. The antenna assembly of any one of examples 1-7, wherein the antenna structure is manually foldable or rollable between the stowed and deployed positions.

Example 9. The antenna assembly of any one of examples 1-8, wherein the array of conductive patches is a first array, the antenna assembly comprising: a third flexible layer including a second array of conductive patches on a third layer of dielectric material, wherein the third flexible layer is rollable or foldable.

Example 10. The antenna assembly of example 9, wherein: the first array of conductive patches comprises at least a first patch and a second patch; the second array of conductive patches comprises at least a third patch and a fourth patch; and in the deployed position of the antenna assembly, the first patch is above the third patch and the ground plane, and the second patch is above the fourth patch and the ground plane.

Example 11. The antenna assembly of any one of examples 1-10, wherein: the array of conductive patches comprises a first conductive patch and a second conductive patch that are not in contact with each other; and the first conductive patch and the second conductive patch are flexible, such that each of the first and second conductive patches are rollable or foldable.

Example 12. The antenna assembly of any one of examples 1-11, wherein: the array of conductive patches comprises a first conductive patch and a second conductive patch that are not in contact with each other; and the first conductive patch and the second conductive patch are rigid, and the second flexible layer is foldable along a section of the second flexible layer that is between the first and second conductive patches.

Example 13. The antenna assembly of any one of examples 1-12, wherein: the array of conductive patches comprises a first conductive patch and a second conductive patch that are not in contact with each other; and the first conductive patch and the second conductive patch are rigid, such that they hold their shape even when the antenna structure is in the stowed position.

Example 14. The antenna assembly of any one of examples 1-13, wherein the first flexible layer further includes an antenna feed on a first side of the first layer of dielectric material, wherein the ground plane is on a second side of the first layer of dielectric material.

Example 15. A method of operating an antenna assembly, the antenna assembly comprising (i) a first flexible layer including a ground plane on a first layer of dielectric material, and (ii) a second flexible layer including an array of conductive patches on a second layer of dielectric material, the method comprising: arranging the antenna assembly in a stowed position, by rolling or folding at least a part of the first flexible layer and the second flexible layer; rearranging the antenna assembly in a deployed position, by unrolling or unfolding at least the part of the first flexible layer and the second flexible layer; and operating the antenna assembly by radiating signals, while the antenna assembly is in the deployed position.

Example 16. The method of example 15, wherein the antenna assembly is transportable in the stowed position of the antenna assembly, and wherein arranging the antenna assembly in the stowed position comprises: rolling the first flexible layer including the ground plane and the first layer of dielectric material around a first roller; and rolling the second flexible layer including the array of conductive patches and the second layer of dielectric material around a second roller.

Example 17. The method of example 16, wherein arranging the antenna assembly in the stowed position comprises: causing the first roller and the second roller to rotate, there causing the rolling of the first flexible layer around the first roller and the rolling of the second flexible layer around the second roller.

Example 18. The method of any one of examples 15-17, wherein arranging the antenna assembly in the deployed position comprises: unrolling the first flexible layer including the ground plane and the first layer of dielectric material from around a first roller; and unrolling the second flexible layer including the array of conductive patches and the second layer of dielectric material from around a second roller.

Example 19. An antenna assembly, comprising: an array of conductive patches on a first layer of dielectric material; and a ground plane having an array of aperture slots, the ground plane on a second layer of dielectric material; wherein one or both the first and second layers of dielectric material are rollable or foldable; and wherein when the one or both of the first and second layers of dielectric material are unrolled or unfolded, each patch of the array of conductive patches is at least in part above corresponding one or two aperture slots of the array of aperture slots of the ground plane.

Example 20. The antenna assembly of example 19, wherein the array of conductive patches is a first array of conductive patches, and wherein the antenna assembly comprises: a second array of conductive patches on a third layer of dielectric material; wherein the third layer of dielectric material is rollable or foldable; and wherein when the first, second, and third layers of dielectric material are unrolled or unfolded, the second array of conductive patches are above the first array of conductive patches.

Numerous specific details have been set forth herein to provide a thorough understanding of the examples. It will be understood, however, that other examples may be practiced without these specific details, or otherwise with a different set of details. It will be further appreciated that the specific structural and functional details disclosed herein are representative of examples and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. Furthermore, examples described herein may include other elements and components not specifically described, such as electrical connections, signal transmitters and receivers, processors, or other suitable components for operation of the antenna system 100.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and examples have been described herein. The features, aspects, and examples are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An antenna assembly comprising:

a first flexible layer including a conductive ground plane on a first layer of dielectric material;

a second flexible layer including an array of conductive patches on a second layer of dielectric material;

wherein the first and second flexible layers are rollable or foldable, to provide a stowed position for the antenna assembly and a deployed position for the antenna assembly;

a first roller configured to rotate around a first axis of rotation, wherein (i) in the stowed position, the first flexible layer including the ground plane and the first layer of dielectric material is rolled around the first roller, and (ii) in the deployed position, the first flexible layer including the ground plane and the first layer of dielectric material is at least partially unrolled from the first roller; and a second roller configured to rotate around a second axis of rotation, wherein (i) in the stowed position, the second flexible layer including the array of conductive patches and the second layer of dielectric material is rolled around the second roller, and (ii) in the deployed position, the second flexible layer including the array of conductive patches and the second layer of dielectric material is at least partially unrolled from the second roller;

a support structure;

wherein a first end of the first flexible layer including the ground plane and the first layer dielectric material is attached to the first roller, and a second end of the first flexible layer including the ground plane and the first layer dielectric material is attached to the support structure; and wherein a first end of the second flexible layer including the array of conductive patches and the second layer dielectric material is attached to the second roller, and a second end of the second flexible layer including the array of conductive patches and the second layer dielectric material is attached to the support structure.

2. The antenna assembly of claim 1, wherein in the deployed position, the array of conductive patches of the second flexible layer is above and separated from the ground plane of the first flexible layer.

3. The antenna assembly of claim 1, wherein:

the first and second rollers are mounted in a fixed position, and the support structure is laterally movable relative to the first and second rollers.

4. The antenna assembly of claim 1, comprising:

a motor configured to cause lateral movement of the support structure relative to the first and second rollers.

5. The antenna assembly of claim 1, wherein a lateral movement of the support structure causes the first and second rollers to rotate, and causes the antenna assembly to transition between the stowed and deployed positions.

6. The antenna assembly of claim 1, wherein the antenna structure is manually foldable or rollable between the stowed and deployed positions.

7. The antenna assembly of claim 1, wherein the array of conductive patches is a first array, the antenna assembly comprising:

a third flexible layer including a second array of conductive patches on a third layer of dielectric material, wherein the third flexible layer is rollable or foldable.

8. The antenna assembly of claim 7, wherein:

the first array of conductive patches comprises at least a first patch and a second patch;

the second array of conductive patches comprises at least a third patch and a fourth patch; and in the deployed position of the antenna assembly, the first patch is above the third patch and the ground plane, and the second patch is above the fourth patch and the ground plane.

9. The antenna assembly of claim 1, wherein:

the array of conductive patches comprises a first conductive patch and a second conductive patch that are not in contact with each other; and the first conductive patch and the second conductive patch are flexible, such that each of the first and second conductive patches are rollable or foldable.

10. The antenna assembly of claim 1, wherein:

the array of conductive patches comprises a first conductive patch and a second conductive patch that are not in contact with each other; and the first conductive patch and the second conductive patch are rigid, and the second flexible layer is foldable along a section of the second flexible layer that is between the first and second conductive patches.

11. The antenna assembly of claim 1, wherein:

the array of conductive patches comprises a first conductive patch and a second conductive patch that are not in contact with each other; and the first conductive patch and the second conductive patch are rigid, such that they hold their shape even when the antenna structure is in the stowed position.

12. The antenna assembly of claim 1, wherein the first flexible layer further includes an antenna feed on a first side of the first layer of dielectric material, wherein the ground plane is on a second side of the first layer of dielectric material.

13. The antenna assembly of claim 1, wherein the array of conductive patches is a first array of conductive patches, and wherein the antenna assembly comprises:

a second array of conductive patches on a third layer of dielectric material; wherein the third layer of dielectric material is rollable or foldable; and wherein when the first, second, and third layers of dielectric material are unrolled or unfolded, the second array of conductive patches are above the first array of conductive patches.

* * * * *